United States Patent [19]

Sturman et al.

[11] 4,232,707
[45] Nov. 11, 1980

[54] CONTROLLER FOR FLUID FLOW SYSTEMS

[75] Inventors: Oded E. Sturman; Benjamin Grill, both of Northridge, Calif.

[73] Assignee: Hydronic Systems, Inc, Woodland Hills, Calif.

[21] Appl. No.: 927,942

[22] Filed: Jul. 25, 1978

[51] Int. Cl.$^3$ ............................................. G05B 11/01
[52] U.S. Cl. .................................. 137/624.2; 239/70; 307/38; 307/41; 307/132 R; 307/140
[58] Field of Search .................... 137/624 A, 624.2; 239/63, 64, 65, 66, 70; 307/38, 40, 41, 132, 140, 141

[56] References Cited

U.S. PATENT DOCUMENTS

| | | | |
|---|---|---|---|
| 3,989,066 | 11/1976 | Sturman | 137/624.2 |
| 3,991,375 | 11/1976 | Riggs | 239/64 |
| 3,991,939 | 11/1976 | Maclay | 239/63 |
| 4,101,786 | 7/1978 | Ruggles | 137/624.2 |

Primary Examiner—Alan Cohan

Attorney, Agent, or Firm—Freilich, Hornbaker, Wasserman, Rosen & Fernandez

[57] ABSTRACT

A controller which can be set to operate a group of sprinkler control valves, which can be easily set and tested for proper automatic operation, and which can operate a sprinkler system in a variety of ways. The controller includes a clock, a series of dividers for dividing down the frequency of the clock, and a group of controls that can be operated to begin sprinking cycles at predetermined times and close the sprinking control valves after predetermined durations. A selector control can be utilized to effectively increase the frequency of the clock, as by bypassing a divider stage, to operate the system at a very rapid rate, which is useful in testing the system for automatic operation after it is set and for repetitive short duration sprinkling cycles. The controller has a cascade input that enables the beginning of a cycle of operation by an external signal, to permit repeated cycling of the system, and to synchronize a group of controllers.

7 Claims, 8 Drawing Figures

CONTROLLER FOR FLUID FLOW SYSTEMS

BACKGROUND OF THE INVENTION

Automatic sprinkler systems can utilize a controller with an electronic timing system, which can be set to deliver current pulses that turn on solenoid-operated valves at predetermined times, and which can be set to deliver additional pulses to turn off the valves after preset duration times. Our earlier patent for Fluid Control System No. 3,989,066 and our earlier patent application Fluid Control System and Controller and Moisture Sensor Therefore, Ser. No. 662,682, filed Mar. 1, 1976, describe controllers of this type which can be preset to control the times and durations of sprinkling cycles. While such controllers and systems therefor provide considerable versatility, additional versatility in use and convenience in setting and testing are desirable.

SUMMARY OF THE INVENTION

In accordance with one embodiment of the present invention, a fluid control system is provided which can be utilized with great versatility in controlling fluid flow and which can be easily set and tested. The system includes a controller with a clock, a group of dividers for dividing the frequency output of the clock, and switches connected to the divider outputs to enable setting of the times at which fluid control valves are turned on and off. The timing circuit which includes the clock and dividers, can be selectively operated at a normal slow rate, or can be operated at a fast rate as by bypassing one or more divider stages. Such fast operation has several uses, such as in enabling testing, in a short time, of automatic system operation which would proceed over a period of several days during normal clock operation.

The controller, which has a group of terminals that can provide pulses to operate a series of valves in sequence, also has a cascade input which can receive a pulse to begin a sprinkling cycle. In one mode of operation, the "off" signal to the last of a series of valves, is delivered to the cascade input of the controller, to operate the series of valves in a continuous cycle wherein the group of valves are continuously operated in sequence. This mode of operation can be useful in providing considerable water to each of several areas of land while preventing run-off of water, by sprinkling each area for a brief period of time but repeating the sprinkling after short delay periods while other areas are being sprinkled. When utilized with the fast clock setting, very short but repetitive sprinkling operation can be obtained, which is useful for misting in green houses. The cascade input of a controller enables a series of controllers to be operated in sequence, with the off pulse to the last valve of one controller system being utilized to initiate a sprinkling cycle for the valves connected to the next controller. This assures that there is no drift in the timing of operation of groups of valves controlled by different battery-operated controllers.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
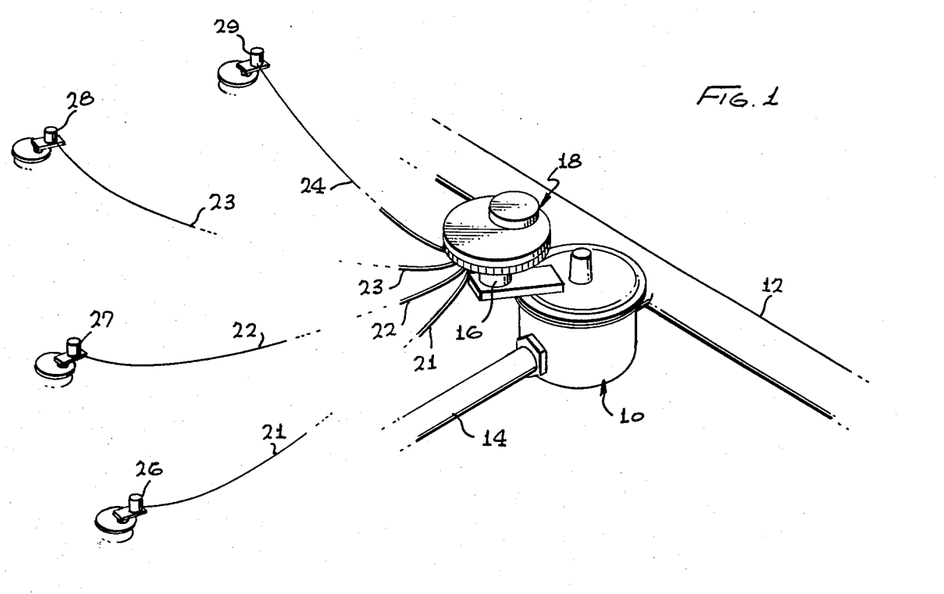
FIG. 1 is a partial perspective view of a sprinkling system constructed in accordance with one embodiment of the present invention.

FIG. 1 illustrates a sprinkler system which includes a diaphragm-controlled valve 10 that can control the flow of water from a main pipe line 12 to a secondary line 14 that leads to a group of sprinkler heads. The system includes a solenoid-actuated pivot valve 16 that controls operation of the diaphragm-type valve 10, and a controller 18. The controller 18 provides current pulses to the solenoid valve 16, as well as pulses over pairs of wires 21-24 that lead to other solenoid-actuated valves 26-29. The controller 18 can be set to open the valve 10 at predetermined intervals, such as once every day, and for selected periods such as six minutes, and can operate the other valves 26-29 in succession after the valve 10 is opened and closed. Thus, the controller 18 can be utilized to control an entire or major portion of a sprinkling system for home or agricultural use, or to control fluid flow in other applications.

Figure 2:
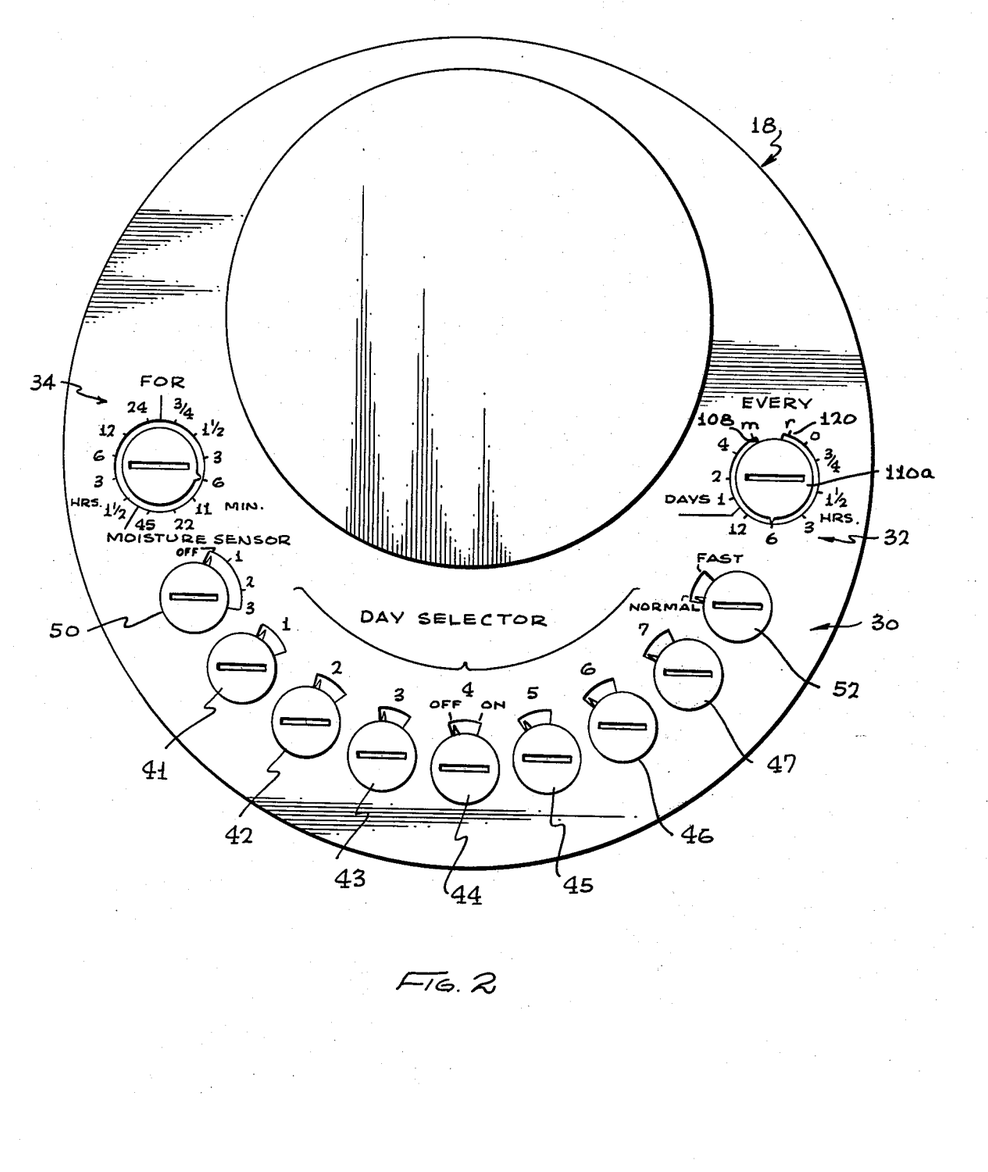
FIG. 2 is a plan view of the control panel of the controller in the system of FIG. 1.

FIG. 2 illustrates the control panel 30 of the controller 18, which is accessible by removing a cover on the controller. The control panel 30 includes an "Every" switch 32 which enables a person to select the frequency of watering cycles, that is, the time lapse between successive openings of the first valve controlled by the controller. A first group of markings at the switch 32 designates the frequency in hours and is marked "¾", "1½", "3", "6", and "12" to designate these number of hours between successive openings of the sprinkling valves. Another group of markings designating the frequency in days is marked "1", "2", and "4" to designate up to four days delay between successive watering cycles. A marking "m" indicates manual beginning of a watering cycle, and when a switch is turned there a single watering cycle begins. Another marking "r" designates resetting of the timing clock of the controller to designate the beginning of a timing cycle, while a marking "0" is utilized to maintain the time in the clock constant so it does not advance. Another control 34 designated "For" is utilized to select the period during which each valve is kept open. The periods range from ¾ minutes to 24 hours. Thus, a person can begin setting the controller for watering cycles, by setting the "Every" switch 32 to designate the frequency at which watering cycles occur, and by setting the "For" switch 34 to designate the duration during which a valve is kept open during a watering cycle.

The controller 18 includes seven "Day Selector" switches 41-47 which can be individually set to designate on which days of the week watering cycles can occur. For example, if the clock in the controller begins operation at midnight on Monday morning, then the switches designated "1" through "7" will respectively designate whether watering occurs on the days Monday through Sunday of each week. Thus, if only the switches 41 and 44 are turned on, then watering will occur only on Monday and Thursday, and at a frequency on each day determined by the setting of the "Every" switch 32.

Another switch 50 can be utilized when a moisture probe is connected to the controller to measure the moisture level of the ground. Setting of the moisture switch 50 determines whether the moisture probe will be utilized to cancel a watering, and also, by whether the switch is in the "1", "2", or "3" positions designates what level of resistance sensed by the moisture sensor will cause cancellation of a watering.

Another switch 52 controls the clock speed of the controller. When the switch 52 is at "normal", the controller operates the valves according to the time durations indicated on the various switches 32, 34, and 41–47 of the control panel, so that, for example, placing the "every" switch 32 in the "6 hour" position will cause the valves to be turned once every six hours. When the switch 52 is moved to the "fast" position, the clock or timing circuit of the controller is operated at a much higher frequency, the particular controller then operating at 84 times the frequency utilized in the "normal" mode. Thus, in the "fast" mode, and with the "Every" switch set at "6 hours", the watering cycle will begin every 4.3 minutes (1/84th of 6 hours) instead of every six hours. Also, the duration of valve opening will be once eighty fourth that set on the "FOR" switch 34, and the Day Selector switches 41–47 will control operation at successive intervals of 1/84th of a day. A fast mode at least ten times the normal mode, or in other words at least one order of magnitude higher, is preferred to significantly speed up the watering cycles, as will be discussed below.

Figure 3:
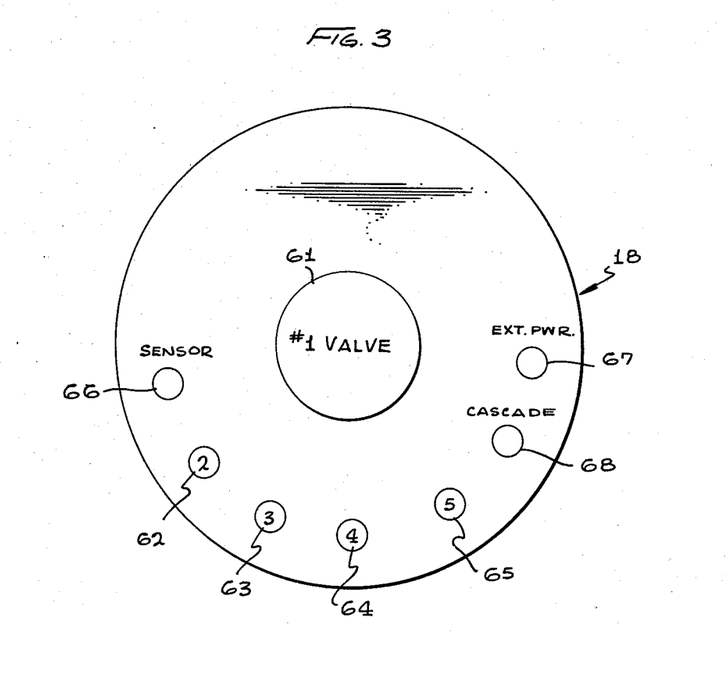
FIG. 3 is a representational bottom view of the controller of FIG. 2.

FIG. 3 shows the various pairs of external terminals 61–68 located at the bottom surface of the controller. A first pair of terminals 61 is connected to the actuator 16 of the first valve to which the controller is connected and on which it is mounted. The terminal pairs 62–65 are connected to the actuators of four other valves 26–29, so that pulses can be delivered to those valves to turn them on and off. A terminal pair 66 is connected to a moisture sensor lying in the ground, which measures the moisture and permits the moisture switch 50 on the control panel to cancel a watering cycle. A terminal pair 67 permits an external power source to be utilized to power the controller. An "external start" or "cascade" terminal pair 68 enables a pulse to be received by the controller to initiate a watering cycle, so that the watering cycle is controlled by an external signal rather than by the timing circuit in the controller 18.

Figure 4:
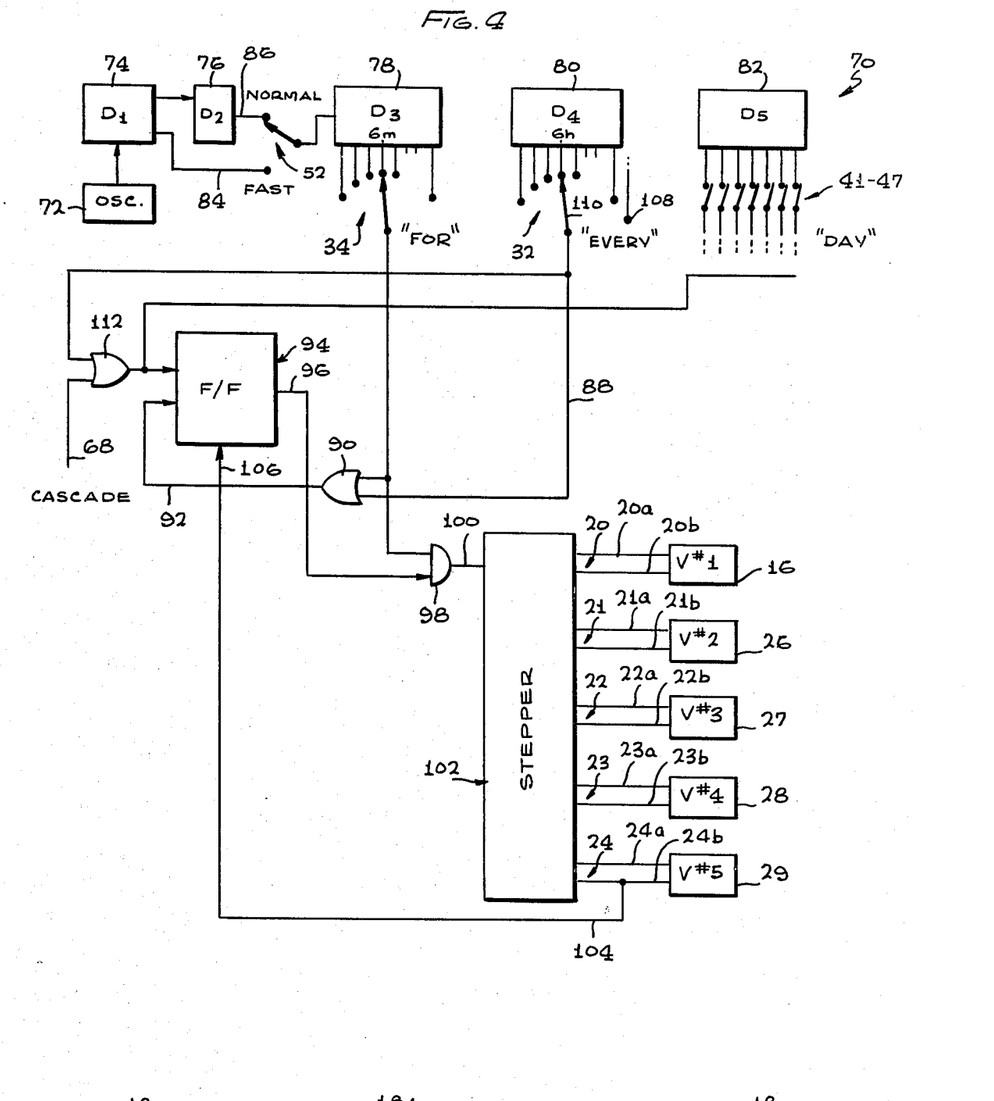
FIG. 4 is a block diagram of the controller of FIG. 2.

FIG. 4 shows the circuit 70 of the controller in simplified form. The circuit includes the "Every" switch 32 for designating the frequency of watering cycles, the "For" switch 34 for designating the duration of valve opening during each cycle, and the "Day Selector" switches 41–47 that select the days on which watering cycles can be performed. The wires 20–24 lead from output terminals of the circuit to solenoids or the like of five valves 16 and 26–29.

The circuit 70 includes an oscillator 72 which generates a high frequency signal, and a group of dividers 74–82 generally connected in series to divide down the high frequency oscillator signal into lower frequency signals that occur at a rate as low as one pulse per week (or one pulse per four weeks). The "normal-fast" switch 52 can be utilized to connect a conductor 84 directly from a first divider 74 to a third divider 78 to bypass an intermediate divider 76. Thus, when the switch 52 is switched from the illustrated position to a position at which it contacts the conductor 84, the signals generated by the last three dividers 78–82 will be at a higher frequency. For example, if the same output from the first divider 74 were delivered to the second divider 76 and to the conductor 84, and if the second divider 76 divided by a factor of eighty-four, then switching switch 52 from the output 86 of the second divider to the conductor 84 would result in speeding up the timing function by a factor of eighty-four.

In FIG. 4, the "Every" switch 32 has been set for 6 hours, the "For" switch 34 has been set for 6 minutes, and the "Day Selector" switches 41–47 have all been turned to the on positions. Accordingly, every six hours a pulse will be delivered by divider 80 through the "Every" switch 32, to pass along the conductor 88 to an "OR" gate 90. The pulse passes through the gate 90 to a set input 92 of a flip-flop 94 to set the flip-flop. The flip-flop then delivers a high output over its terminal 96 to an "AND" gate 98. At the same time, the "For" switch 34 will be receiving a pulse from divider 78, and will delivers the pulse over a conductor 102 to the "AND" gate 98, so that the "AND" gate 98 delivers a pulse over line 100 to a stepper switch 102. The pulse delivered to the stepper 102 causes it to initially deliver an on pulse over a line 20a to the valve 16 to turn on the valve and begin the watering cycle.

In the above example, six minutes after the valve 16 has been turned on, another pulse is delivered through the "For" switch 34 over line 102 to the "AND" gate 98, so that gate delivers a pulse over line 100 to the switch 102 to cause it to step to a next state. In this next state, the stepper 102 delivers an off pulse over a line 20b to the valve 16 to turn off the valve (actually it can deliver a pulse over the same lines but with opposite polarity), and delivers an on pulse over a line 21a to turn on the next valve 26. Six minutes later, the pulse from the "For" switch 34 is delivered to the stepper 102 so it delivers an "off" pulse over line 21b to turn off valve 26 and delivers an "on" pulse over line 22a to turn on valve 27. The turning on and turning off of the rest of the valves continues until an "off" pulse is delivered over line 24b to the last valve 29 to turn it off. The pulse on line 24b is also delivered through a line 104 to a reset input 106 of the flip-flop 94 to reset it, so that line 96 drops to a low state to prevent any further pulses passing through the "AND" gate 98 to the stepper 102. Otherwise, a pulse received six minutes later from the "For" switch 34 would pass through the "AND" gate 98 and return the stepper 102 to its initial position to open the first valve 16.

Although the flip-flop 94 can be set at predetermined intervals through the "Every" switch 34, it can also be set manually to enable a person to begin the watering cycle at any time, (at the next "For" signal), and also can be set by an externally or internally generated "cascade" signal to begin a watering cycle. The "Every" switch 32 has a terminal 108 to which a contact 110 of the "Every" switch can be connected, to produce an output pulse from the "Every" switch as soon as it reaches the contact 108. Thus, if a person turns the "Every" switch to the contact position 108, a pulse is immediately delivered from the "Every" switch through an "OR" gate 112 to the flip-flop 94 to set the flip-flop, so that subsequent pulses from the "For" switch 34 can begin opening and later closing each sprinkling valve. In FIG. 2, it can be seen that a contact position at 108 labelled "m" for manual, is provided, to which the switch dial 110a can be moved to initiate a watering cycle.

A cascade or external start terminal 68 (FIG. 4) is connected through the "OR" gate 112 to the flip-flop 94, to enable an external pulse to set the flip-flop so as to begin a watering cycle which is thereafter controlled by the output of the "For" switch 34. This cascade terminal 68 enables the controller to be utilized in a number of system configurations that are of considerable practical importance.

Figure 7:
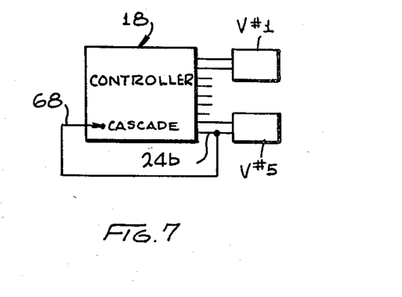
FIG. 7 is a block diagram of another sprinkler system arrangement which utilizes the controller of FIG. 2.

In one system, the "off" signal delivered to the last valve 29 over line 24b, is also delivered to the cascade input 68, to begin a new watering cycle wherein the five valves 16, 26–29 are opened in sequence, as soon as the last valve 29 has closed at the end of the previous watering cycle. In this manner, an indefinite number of watering cycles can be produced successively without a large interruption between them. FIG. 7 illustrates this connection wherein the output over the "off" line 24b is connected to the cascade input 68 of the same controller 18. Such a continuous cascade connection is useful in several applications. In some watering systems, the level of water pressure is very sensitive to the amount of water drawn off for watering purposes, and damage to the system can be done if the water pressure is allowed to rise excessively. For example, in certain drip irrigation systems that back flush the filters to clean them, the filters can be damaged if high pressures are present in the water lines, and continuous watering is relied upon to prevent high pressures. The continuous cascade connection shown in FIG. 7 assures that water will always be drawn off from the system, and yet any one land area covered by sprinklers connected to one of the valves will not be left on for an excessively long period which could cause saturation or flooding of that area.

Another application wherein continuous cascading is useful, is in misting in greenhouses, wherein each of a number of sprinkling valves is turned on for a very brief period such as two seconds each. Although it would be possible to provide additional controls similar to the "Every" switch 32 and "For" switch 34 to enable water cycles to begin at short intervals such as a fraction of a minute, and with each valve turned on only a few seconds at a time, this adds complication to the control panel as well as to the circuitry. However, when utilized in conjunction with the fast clock switch 52 (FIG. 4), rapid cascading can be easily set up. For example, by setting the "For" switch 34 for three minute periods, setting the clock rate switch 52 on fast, and connecting a valve output 24b to the cascade input 68 for continuous cascading, a group of valves will each be turned on for two seconds each in a sequence that repeats with minimal quiesant non-watering periods.

Figure 6:
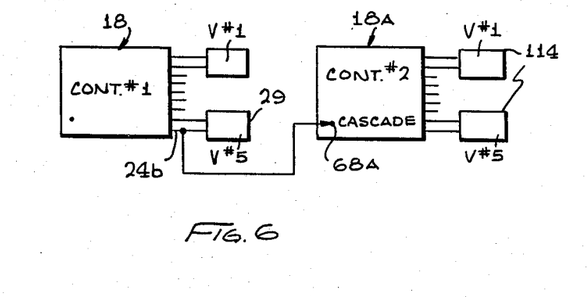
FIG. 6 is a simplified block diagram of a sprinkler system arrangement utilizing the type of controller shown in FIG. 2.

The cascade input 68 is also useful in slaving one or more additional controllers to a first controller. Such a connection is shown in FIG. 6, wherein the "off" signal over line 24b to a last valve 29 connected to a first controller 18, enters the cascade input 68A of a second controller 18A to begin a watering cycle for the various valves 114 operated by the second controller. Of course, the "off" signal sent over a line 116 to the last of the valves 114 of the second controller can be connected to the cascade input of a third controller. In this way, the operation of a group of controllers is synchronized, and yet the same controller unit identical to the controller 18 can be utilized at different locations to also enable individual setting of the duration each valve is on in a water cycle. For example, the watering cycles for controller 18 may be set at six minutes where large sprinkler heads cover a small area, while the watering cycle at the controller 18A may be set at twenty two minutes where slowly rotating sprinkler heads are utilized to cover a large ground area. It would be possible to control each of the controllers separately with its own clock, but then there would likely be some drift in the time of the two clocks, so that the two controllers would soon become unsynchronized. Synchronization useful, for example, in assuring that the two controllers 18 and 18A are not conducting their watering cycles at the same time, which could cause an excessive drop in water pressure so that the sprinkler heads do not project water as far as calculated. Of course, it is also possible to connect the output from a last valve of a last controller, back to the cascade input 68 of a first controller, to produce continuous cascading through a group of controllers and their associated valves.

It may be noted that, where only cascading operation is desired, so that the "Every" switch 32 is not utilized, the "Every" switch can be operated (FIG. 2) by turning it to the manual indication 108 to provide a pulse that begins a watering cycle, and then by leaving it in this position so that no further pulse is delivered through the "Every" switch, but instead only cascade pulses thereafter begin each watering cycle. As noted earlier, the "Every" switch has a position 120 labelled "r" designating reset of the timing circuit, to reset all of the dividers so that the timing begins at the beginning of day "1" wherein the Day Selector 41 begins controlling the time of watering for a 24 hour period. Also, the switch can be set to another position 122 labelled "o" wherein the timing circuit stops advancing, but maintains the time it is at.

Figure 5A:
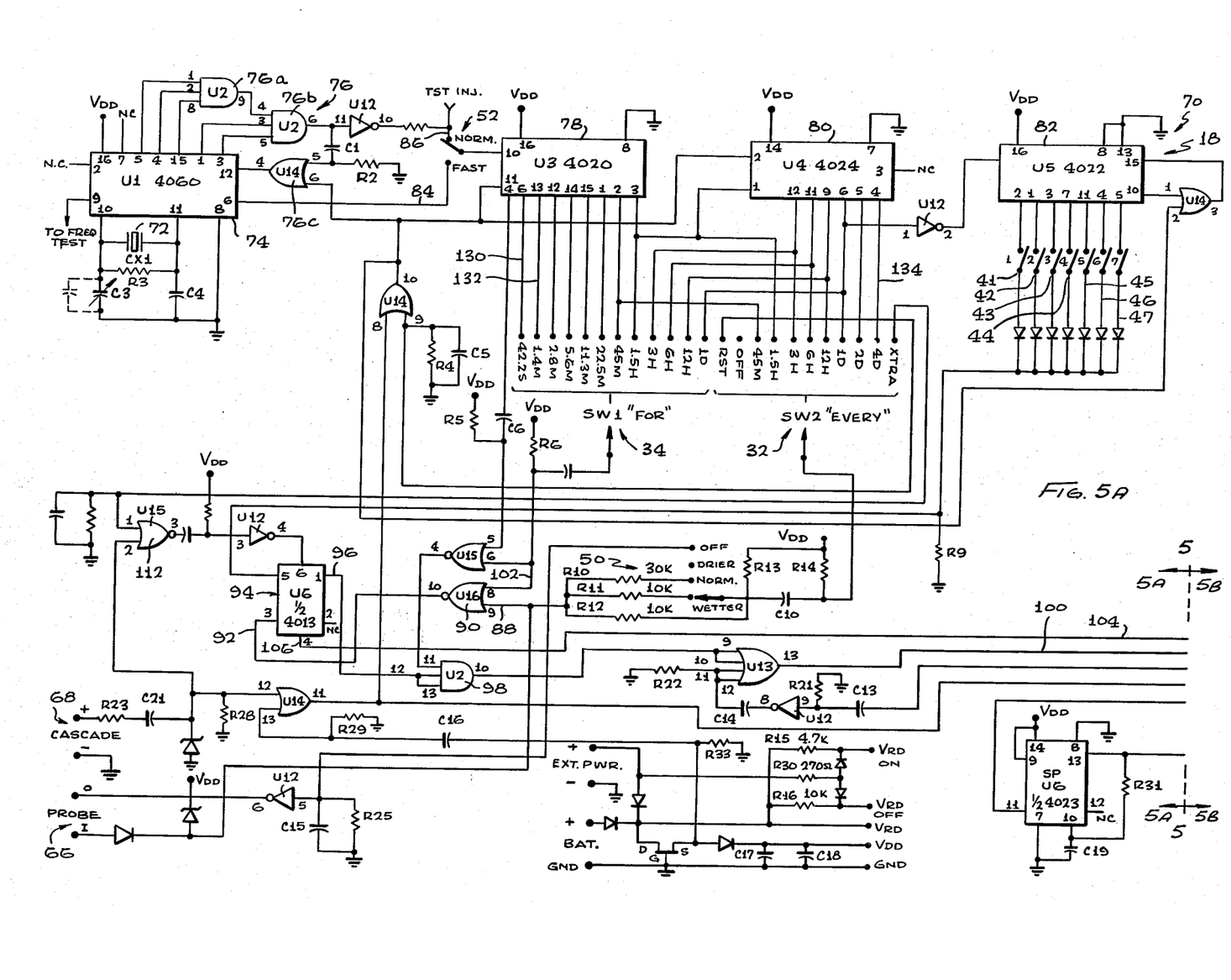
FIGS. 5A and 5B are a schematic diagram of the controller of FIG. 2, and on which the block diagram of FIG. 4 is based.
Figure 5B:
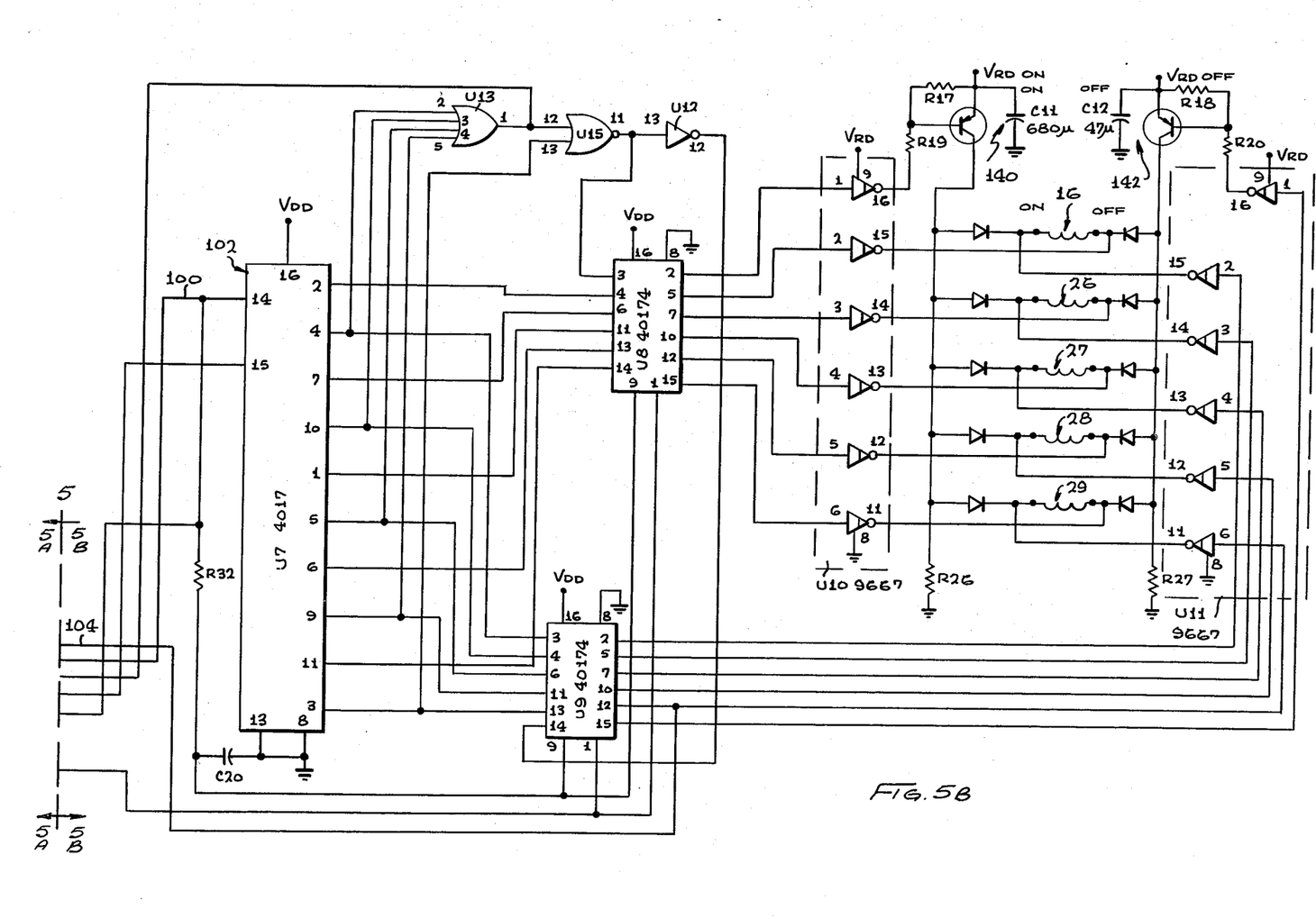

FIG. 5 is a schematic diagram showing details of the circuit of FIG. 4. The oscillator 72 is utilized in conjunction with a CMOS 4060 device 74 to produce 330 millisecond pulses that drive the dividers that produce pulses at the switch contacts of the "For", "Every", and "Day" switches 34, 32 and 41–47. It can be seen that the various frequencies of the "For" and "Every" switches 34, 32 represents frequencies that are successively divided by two. For example, a first contact 130 of the "For" switch produces pulses at a rate of one pulse per 42.2 seconds, while the contact 132 delivers pulses at one half that rate, until the contact 134 of the "Every" switch produces an output at a rate of one pulse per four days. This arrangement is utilized to assure that whenever there is an output from one of the low frequency outputs such as 134, there is a simultaneous output at all of the lower frequencies such as on terminals 130, 132. Such simultaneous pulses facilitate the design of logic circuits that require simultaneous pulses. However, the generation of pulses for even days, on "Day" switches 42, 44 and 46 cannot be easily achieved with just any fundamental frequency that is divided down. It can be easily achieved by utilizing a crystal oscillator at 72 that generates a 49.710 kilohertz output, in conjunction with binary dividers. However, such crystals are relatively expensive and difficult to obtain, as compared to 32.768 kilohertz crystals that are commonly used in digital watches. The circuit of FIG. 5 can utilize an easier to obtain crystal 72 of 32.768 KHz in conjunction with binary dividers to generate the required frequencies, by the use of the gates 76a, 76b of the divider 76. This is accomplished essentially by adding the chosen frequencies through the divider gates 76a and 76b, and by resetting the divider device 74 by a gate 76c when a frequency is obtained (in this case 3.03 milliseconds between pulses, or 330 pulses per second) which can be divided in binary stages to obtain a one pulse per day rate.

The provision of a "fast" clock mode which advances the system timing eighty-four times faster than normal, is useful not only in permitting repetitive very short watering when used in a continuous cascade mode of operation, but also in facilitating testing and time set up. It is useful to test a system for proper automatic operation after pipe and electrical connections have been made and various controller switches set, to assure that all parts of the system will operate properly. However, a full watering cycle involving many valves that open and close in sequence may last a long time, and testing during a control cycle of the "Every" control is even longer. In the present controller, a person can temporarily set the clock in the fast mode, to check out the system for proper automatic operation (especially to see if the moisture probe switch 50 is on the proper setting), and return the clock to the normal mode, without altering the "Every", "For", or "Day Selector" controls.

The fast clock setting is useful in facilitating time set up, by quickly advancing the timing circuit to a desired time. When the clock is reset, by moving the "Every" switch to "r" (FIG. 2), the timing circuit begins counting from the midnight which begins day "1" (that day is controlled by control 41). If the "Every" control is set to "1 day", and it is desired to begin a watering cycle at 4 a.m. every day (which is common in commercial applications), then the controller could be set up by having a person present at 4 a.m. to reset the timing circuit. Of course, this can be a great inconvenience. Instead, by use of the fast mode, a person present at 12 a.m. can set the controller to begin a watering cycle at 4 a.m. The person first resets the timing circuit (turns the "Every" switch to "r" and then to the desired cycle time such as "1 day") and then sets the clock on the fast mode. He then waits until the timing circuit advances by eight hours, so the timing circuit registers a time of 8 a.m., and returns the clock to the normal mode. As a result, sixteen hours later when the actual time has advanced from 12 a.m. to 4 a.m. the next day, the timing circuit will have advanced from an apparent 8 a.m. to an apparent midnight and will begin a watering cycle (when it is actually 4 a.m. in the real world). In actuality, it takes a finite time (11.4 minutes) to advance the clock by sixteen hours at the fast rate. Accordingly, for greater accuracy the person can begin the resetting before 12 a.m. (e.g. at 11:30 a.m.), advance the timing circuit as noted above by sixteen hours by means of the fast mode, and then hold the time by moving the "Every" switch to the "o" position to retain the timing circuit time. Then, at 12 a.m. he can turn the "Every" switch to the "1 day" setting. A table showing the 84 to 1 conversion of "normal" hours to "fast" minutes, can be supplied to aid in controller set up.

Thus, the fast clock control enables great versatility in set up, testing, and various brief watering cycle operations, all with a simple control on the control panel and a simple addition to the timing circuit. One previous system has utilized a push button control to enable skipping of an hour on a timing circuit. However, such an hour skipping feature does not facilitate precise clock setting, and it requires push buttons to facilitate many hour skippings which is disadvantageous because push button switches are more difficult to make watertight and it is easy to make an error in counting the number of times the button has been pushed. Furthermore, such an hour skipping feature cannot readily aid in system testing for automatic operation and in utilizing closely controlled brief watering cycles.

It may be noted that the circuit (FIG. 5) has a probe input 66 which is designed to connect to a moisture probe lying in the ground. The resistance of the probe can be utilized to cancel a watering cycle. In this connection, a moisture setting switch 50 is utilized to control the resistance in series with the "Every" switch 32 to determine the relative weight to be accorded a given resistance measured by the probe. Thus, if the probe is utilized in a soil which is dry even at relatively low probe resistance, the moisture selector switch 50 can be placed in a "wetter" desired soil setting, so that it requires a wetter ground and even lower probe resistance to cancel a watering cycle. The moisture sensing circuit is designed so there is no voltage across the moisture probe terminals until a pulse is delivered to begin a watering cycle (which may be defeated by the moisture sensor), to reduce electrolysis damage to the probe.

It also may be noted that the circuit includes two capacitors 140, 142 respectively utilized to produce the "on" and "off" signals that open and close the valves. Also, the capacitor charging circuitry is arranged so that the "off" capacitor 142 is charged before the "on" capacitor is charged. In prior battery operated systems utilizing a single capacitor to generate both the on and off signals to turn the sprinkler control valves on and off, there was always a danger that the circuit would fail with a valve left on, so that flooding and resulting damage could occur by the time a person noticed the failure and could manually turn off the valve. For example, the battery was most heavily drained during capacitor charging, and there was about a 50% chance that the battery life would end at a time when it readied the capacitor to turn on a valve, so the valve would not be subsequently turned off. The two capacitor arrangement that assures the off capacitor is fully charged prior to charging the on capacitor, prevents failure in a destructive mode. The separate smaller "off" capacitor 142 can be utilized without a current limiting resistor, so there is less drain on the battery to provide a longer life.

Thus, the invention provides a controller which can be set to control fluid valves that govern fluid flow, which facilitates set up and operation of a fluid control system. The controller includes a switch that can be set to determine the frequency of watering cycles and another switch that can be set to determine the length of time before each valve is closed during a watering cycle. A clock means (which could include a 60 cps power line and dividers) which controls the operation of the controller in accordance with the settings of the switches, can be selectively operated between a normal rate at which the watering cycle occurs at the rates indicated on the switches, or in a fast mode wherein the controller operates many times faster than the indicated setting rates. This facilitates set up of the controller to begin counting from a certain day, the testing of a system in an automatic mode during a reasonable period of time, and the operation of a watering system in very brief cycles.

The controller includes a cascade or externally triggered input, which enable the initiation of a watering cycle by an external signal, although the duration of each valve opening during the watering cycle can be determined by the setting of the controller. The cascade input enables repeated opening of the set of valves controlled by a controller, the synchronizing of two of more controllers, or the continuous cascading of groups of valves controlled by groups of controllers. The cascade input is especially useful in "misting" operations and the like when utilized with the fast clock, to repeatedly turn on each of a group of valves for very short periods of time. A moisture sensor input of the controller, which can cancel a watering cycle, is controlled to enable a choice of the level of resistance of the moisture sensor at which a cycle is cancelled. The circuitry for the controller is arranged to enable the obtaining of a needed frequency for binary division, by the use of a commonly available oscillator of a different frequency.

Although particular embodiments of the invention have been described and illustrated herein, it is recognized that modifications and variations may readily occur to those skilled in the art and consequently, it is intended that the claims be interpreted to cover such modifications and equivalents.

The embodiments of the invention in which an exclusive property or privilege is claimed are defined as follows:

1. A fluid flow controller comprising:
   a timing circuit which generates watering duration signals at predetermined intervals;
   a cascade terminal; and
   a stepper and control circuit having output terminals, and responsive to a pulse on said cascade terminal for generating an "on" pulse on a first output to turn on a valve, and responsive to signals from said timing circuit after generation of the "on" pulse to generate off and on control pulses on other outputs including an "off" pulse on said first output to turn off the valve and an "on" pulse on a second output to turn on a second valve, and an "off" pulse on the second output to turn off the second valve.

2. The controller described in claim 1 wherein: said stepper and control circuit includes a settable memory circuit device which is placed in a set state by a pulse on said cascade terminal, and means responsive to the next watering duration signal to generate an "on" pulse on said first output, whereby to assure that the first valve is turned on for the full interval between watering duration signals.

3. The controller described in claim 1 including:
   means coupling one of said stepper circuit outputs to said cascade terminal, to thereby continuously repeat a watering cycle when it is initiated.

4. The controller described in claim 1 including:
   a second controller having a second timing circuit, and having a second stepper circuit with outputs and operable to generate on and off pulses on said outputs at periods determined by said second timing circuit; and
   first means coupling one of said second stepper circuit outputs to the cascade terminal of said first controller, whereby to synchronize operation of said controllers to operate the valves connected thereto in sequence.

5. The controller described in claim 4 wherein:
   said second controller includes a second cascade terminal, and said second stepper circuit begins the generation of said on and off pulses following the receipt of a pulse on said second cascade terminal; and including
   second means coupling one of said first controller stepper circuit outputs to said second cascade terminal, whereby to provide continuous cascading through a plurality of controllers.

6. The controller described in claim 5 wherein:
   said first means which couples a second stepper output to the cascade terminal, includes at least one additional controller having a cascade input and stepper circuit outputs.

7. The controller described in claim 1 wherein:
   said timing circuit includes a clock means and a selector operable to change the output rate of said clock means between a first normal rate and a second faster rate, whereby to enable repeated short duration watering.

* * * * *